United States Patent
Barbour

[11] 3,861,785
[45] Jan. 21, 1975

[54] WIDE ANGLE MIRROR ASSEMBLY
[75] Inventor: Roberto Barbour, Roslyn Harbor, N.Y.
[73] Assignee: Cryton Optics, Inc., Rosyln, N.Y.
[22] Filed: Nov. 15, 1973
[21] Appl. No.: 416,070

[52] U.S. Cl. ............................ 350/202, 350/211
[51] Int. Cl. ............................ G02b 17/00
[58] Field of Search ..................... 350/202, 211

[56] References Cited
UNITED STATES PATENTS
3,340,765  9/1967  Herriott ...................... 350/211 X
3,661,385  5/1972  Schneider ..................... 350/211 X
3,708,222  1/1973  Stern ......................... 350/211 X Primary Examiner—Archie R. Borchelt

[57] ABSTRACT

A flat mirror assembly which incorporates a Fresnel lens and affords a wide angle view. The assembly is constituted by a Fresnel lens molded of plastic material and having a negative focal length, the lens being sandwiched between a rear plane mirror and a clear front pane, the sandwich being held within a frame.

4 Claims, 5 Drawing Figures

PATENTED JAN 21 1975
3,861,785
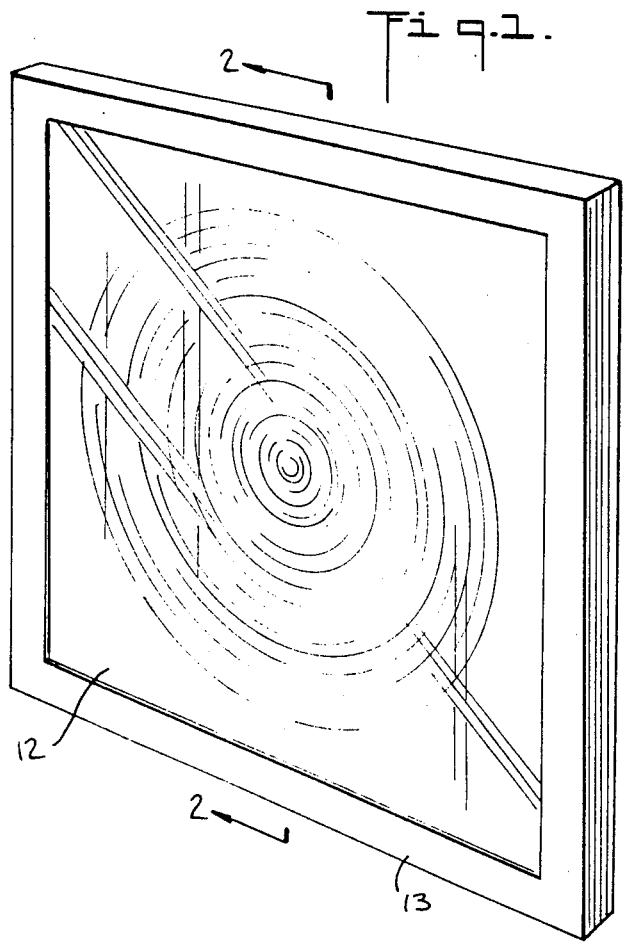
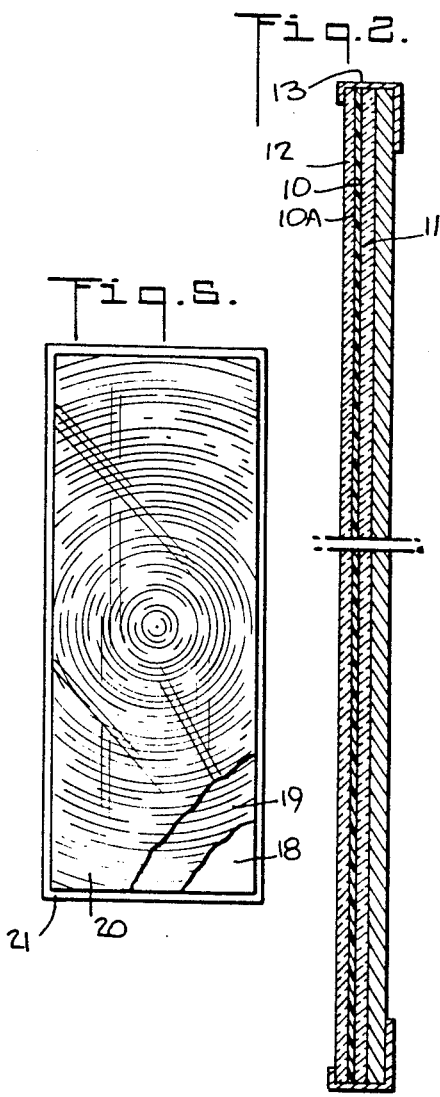
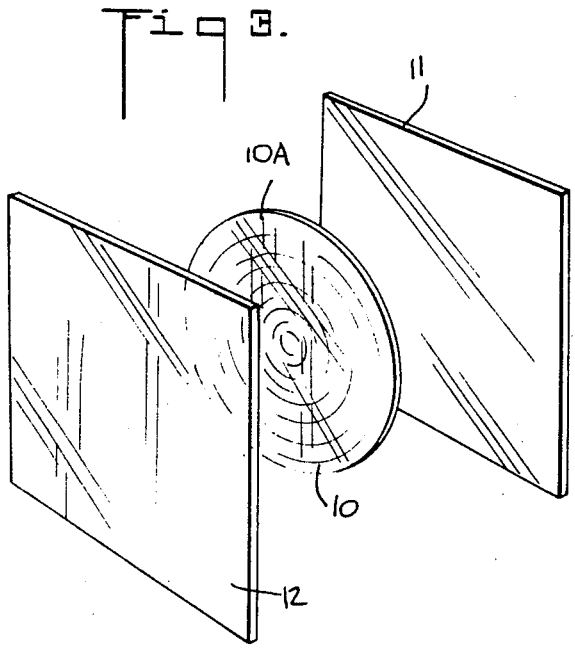
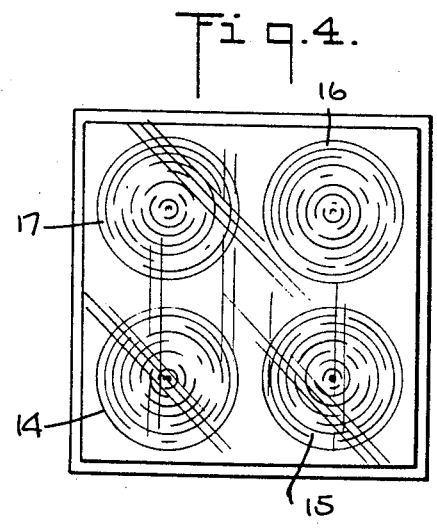

WIDE ANGLE MIRROR ASSEMBLY

BACKGROUND OF THE INVENTION

This invention relates generally to mirrors, and more particularly to a flat mirror assembly which incorporates a Fresnel lens and affords a wide angle view.

A plane mirror forms an image which is erect, reversed and the same size as the object, the image being exactly the same distance behind the mirror as the object is in front of it. Because the image is not formed directly by light rays from the object but rather by the extension of these rays behind the mirror, the image is referred to as a virtual image.

A mirror whose surface is a section of a sphere is known as a spherical mirror. When the outer side is the reflecting surface, the spherical mirror is convex, and when the inner side is reflective, the mirror is concave. In considering the behavior of a spherical mirror, one must keep in mind the side of the mirror from which incident light comes. Because a mirror is opaque, the light, after reflection, must remain on this side and if the image is formed here it will be a real image. Therefore the side of the mirror from which the light comes is called the R-side (for real image) and the back of the mirror is called the V-side (for virtual image) because no light energy is present on this side and the images formed must be virtual.

The focal point for a concave mirror lies on the R-side; hence the focal point is real and the focal length is positive. In a convex mirror, the focal point is virtual, for it lies on the V-side, and the focal length is negative.

Thus the image formed by a spherical mirror differs from that formed by a plane mirror in several respects, for while the plane mirror image is always a virtual image, a concave mirror produces a virtual image when the object is closer to the mirror than one half its radius of curvature and a real image when it is farther away, whereas a convex mirror always produces a virtual image.

The present invention is concerned with mirrors providing a wide angle view, this being characteristic of a convex mirror. In a plane mirror, the virtual image is exactly the same distance behind the mirror as the object is in front of the mirror and the image scale is unchanged, whereas in a convex mirror, the virtual image behind the mirror is more distant and smaller, the reduction in scale being accompanied by a broader field of view.

The advantage therefore of a convex mirror functioning as a rear view reflector is that it affords a more comprehensive view of the scene behind the driver of a vehicle. This wider angle of view encompasses the full width of the road and all vehicles thereon. But the drawback of a convex mirror is that it is not only subject to glare which is also true of plane mirrors, but it also introduces optical distortion.

SUMMARY OF THE INVENTION

In view of the foregoing, it is the main object of this invention to provide a flat mirror assembly affording a clear, wide angle view free of optical distortion.

More particularly, it is an object of this invention to provide a mirror assembly which incorporates a Fresnel lens combined with a plane mirror to define in a flat structure the equivalent of a convex mirror, but without bulging or convexity and without optical distortion or glare.

Also an object of this invention is to provide a mirror assembly useable as a rear view reflector in an automobile to afford a panoramic view encompassing the entire road.

Yet another object of this invention is to provide a Fresnel lens assembly in which the plastic lens is protected against scratching or mutilation.

Briefly stated, these objects are accomplished in a wide angle mirror assembly constituted by a molded plastic Fresnel lens having a negative focal length, the lens being sandwiched between a plane mirror and a front pane, the combination being held together in a frame.

OUTLINE OF THE DRAWING

For a better understanding of the invention as well as other objects and further features thereof, reference is made to the following detailed description to be read in conjunction with the accompanying drawing, wherein:

FIG. 1 is a perspective view of one preferred embodiment of a mirror assembly in accordance with the invention;

FIG. 2 is a transverse section taken in the plane indicated by line 2—2 in FIG. 1;

FIG. 3 is an exploded view of the mirror assembly shown in FIG. 1;

FIG. 4 is a plan view of a second preferred embodiment of the invention; and

FIG. 5 is a plan view of a third preferred embodiment of the invention.

DESCRIPTION OF THE INVENTION

Referring now to FIGS. 1 to 3, there is shown a flat mirror assembly having a wide angle view, the assembly being composed of a Fresnel lens 10, sandwiched between a plane mirror 11 and a transparent glass plate 12, the combination being held together by a square frame 13.

As is well known, a Fresnel lens is one that has a surface consisting of a concentric series of simple lens sections 10A, so that a thin lens with a short focal length and large diameter is possible. By means of a series of precisely spaced, prismatic grooves, each at a different angle and a different depth, one may produce a flat surface lens with the optical characteristics of a curved lens surface. By the use of a clear durable plastic, such as polyethylene and by modern molding techniques, it is possible to create a low-cost plastic Fresnel lens plate having predetermined optical characteristics comparable to those obtained with conventional concave or convex lenses or combinations thereof. In the present invention, the lens design is such as to provide, in combination with a rear reflector, the equivalent of a convex mirror whose focal length is negative.

Plane mirror 11, which is positioned behind Fresnel lens 10, is constituted by a clear glass plate having a silver surface 11A coated on the rear thereof to impart reflective properties thereto. The front plate 12, which is clear, serves to protect the relatively soft surface of the plastic Fresnel lens from scratches. And since the sandwich of the Fresnel lens 10 and glass plates 11 and 12 is locked within frame 13, dust is prevented from entering the sandwich and degrading the clarity of the lens. The assembly may be cleaned simply by washing the outer glass pane 12, when necessary.

Thus one looking into the mirror assembly sees an expanded, wide angle view, rather than the usual, relatively narrow angle view characteristic of a plane mirror. On the other hand, the structure is flat and not much thicker than a framed plane mirror. It may be similarly hung, or it may be mounted on legs or on brackets.

One may provide a mirror assembly arrangement as shown in FIG. 4 which differs from that shown in FIG. 1 only in that instead of a single large Fresnel lens there is sandwiched between the plane mirror 11 and the front pane 12 a symmetrical array of four identical Fresnel lenses 14, 15, 16 and 17, thereby producing a multiple image of four wide angle views.

In the arrangement shown in FIG. 5 which is particularly suited as a rear view mirror for an automobile, the assembly which is composed of a plane mirror 18, an intermediate Fresnel lens 19 and a front pane 20, is rectangular and is held within a rectangular frame 21 to afford a panoramic rear view. Suitable brackets may be provided to support this rear view assembly at an appropriate position in the vehicle.

It will be evident from the foregoing that various configurations are possible to obtain one or more wide-angle views employing a Fresnel lens having a negative focal length. The lens may be designed to correct for astigmatism or other optical aberrations. Because incident light is reflected through a multi-prismatic surface, glare effects are minimized, which is a great advantage in a rear view mirror.

While there have been shown preferred embodiments of the invention, it will be appreciated that many changes may be made therein without departing from the essential spirit of the invention as disclosed herein. For example, the plane mirror or the front pane may be formed of acrylic material rather than glass.

I claim:

1. A wide-angle rear view mirror assembly comprising a flat, thin Fresnel lens having a negative focal length, said lens being constituted by a series of spaced prismatic grooves each at a different angle and at a different depth formed in a clear plastic sheet of high clarity, a plane mirror disposed behind said lens and a transparent plate disposed in front of said lens, said mirror and said plate being in direct contact with said flat lens to form a sandwich assembly, and a frame surrounding the margin of said sandwich assembly and protectively sealing said lens therein to prevent the entry of contaminants that would otherwise disturb the clarity of said lens, said lens having optical characteristics which in combination with said mirror are the equivalent of a convex mirror whose focal length is negative.

2. A wide angle assembly as set forth in claim 1, having a rectangular configuration to produce a panoramic view.

3. An assembly as set forth in claim 2, further including means to support said assembly in an automobile to provide a rear view mirror therefor.

4. An assembly as set forth in claim 1, wherein said lens is molded of plastic material and said plane mirror and said transparent plate are formed of glass.

* * * * *